Aug. 1, 1933.  H. THÜRLINGS  1,920,445
MACHINE FOR STAMPING SOFT KNEADABLE MASSES INTO BON-BONS AND THE LIKE
Filed July 26, 1932  3 Sheets-Sheet 3
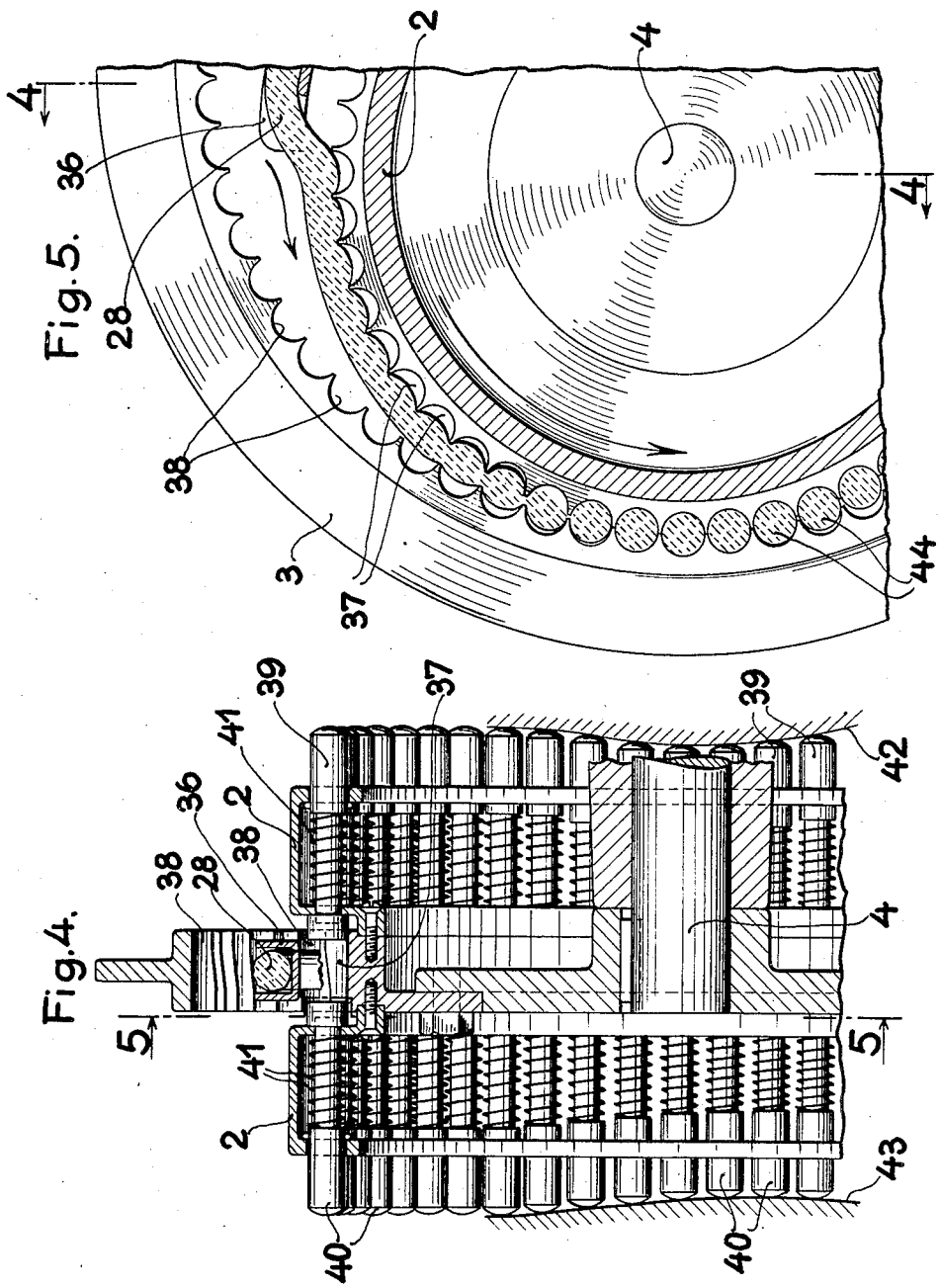
Inventor
*Hermann Thürlings*
By *Fiska & Kekenbus*
Attorneys Patented Aug. 1, 1933

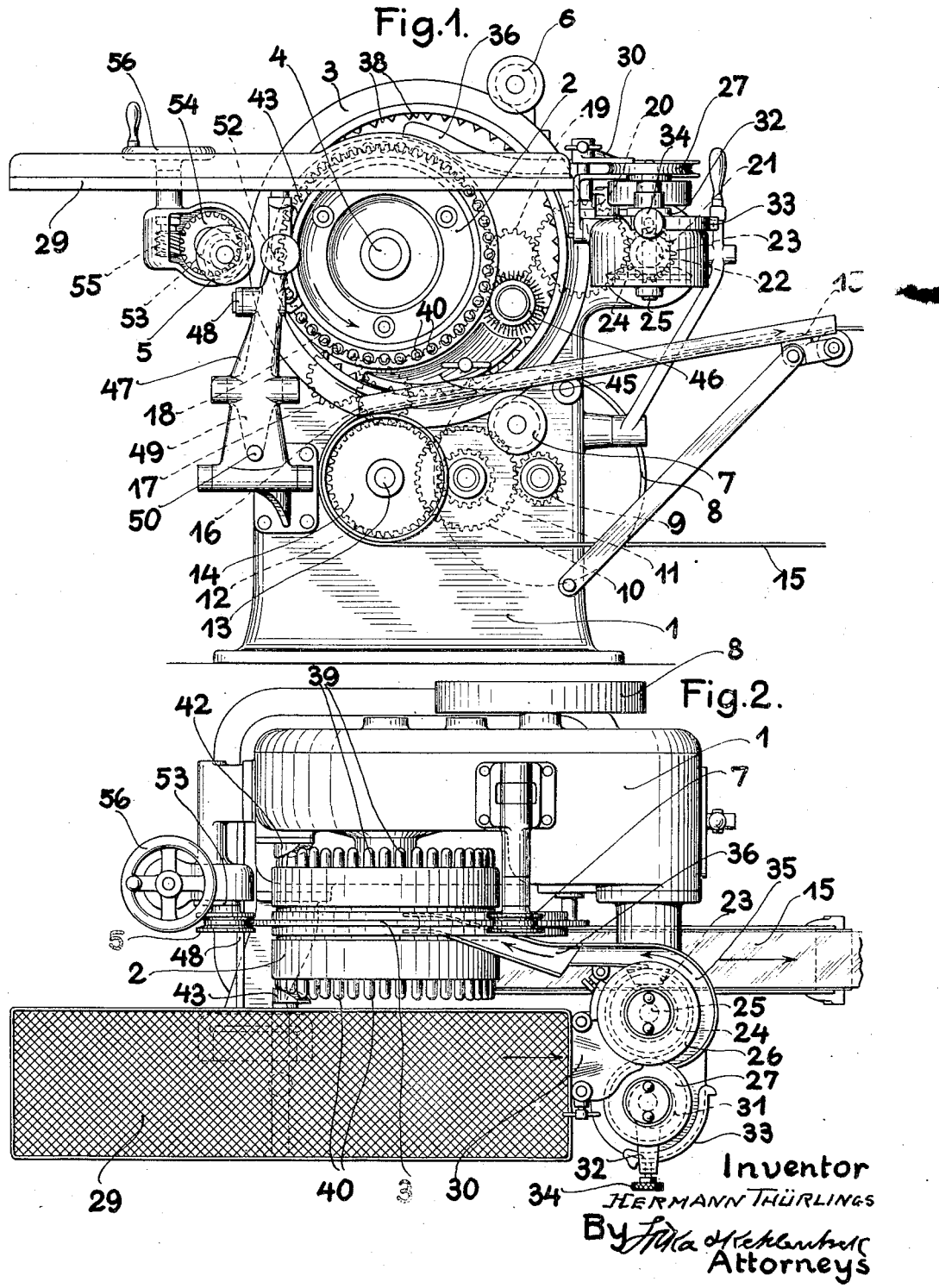

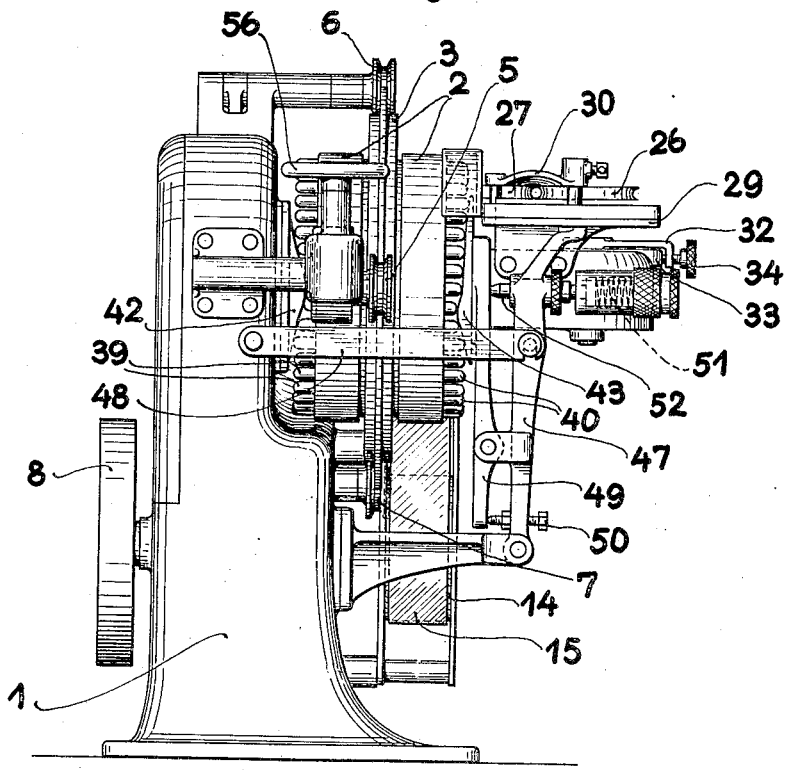

1,920,445

UNITED STATES PATENT OFFICE 1,920,445

MACHINE FOR STAMPING SOFT KNEAD-
ABLE MASSES INTO BON-BONS AND THE
LIKE

Hermann Thürlings, Viersen, Germany

Application July 26, 1932. Serial No. 624,716

5 Claims. (Cl. 107—15)

In the stamping of soft kneadable masses, particularly bon-bons, the product is the better the longer the stamping tool acts to shape the mass and the more carefully the finished stamped piece is delivered from the stamping tool. These conditions are not fulfilled or only very incompletely fulfilled by known stamping machines which work with wheel-like stamping tools. The circumference of the stamping wheel is generally only very insufficiently utilized and its co-operation with the counter stamping wheel takes place only over a very short stretch, i. e. over the contacting circumferential portions of the wheels. The discharge of the stamped pieces from the stamping tool on to the conveyor band of the cooling path following behind the stamping machine has hitherto taken place over a rotating brush or a sliding plate adjusted more or less obliquely to the circumference of the stamping wheel. Both means work unsatisfactorily and have a deforming effect upon the stamped but still soft pieces.

These defects are avoided by the present invention in that the stamping wheel co-operates with a surrounding annular counter stamping body disposed eccentrically to the stamping wheel and constructed in the manner of an internally toothed crown wheel, whereby the two-part stamping moulds exert a common stamping action over a comparatively long stretch. The supply of the mass to be moulded is effected, according to the invention, in such a manner that it frequently changes its direction of travel in the machine. The stamping wheel runs oppositely to the direction in which the rope or strip of the mass is supplied to the machine and oppositely to the direction of travel of the cooling path conveyor band. The sugar rope supplied to the special equalizing rollers is consequently turned round by these and fed to the stamping wheel from the rear. The circumference of the stamping wheel can thus be utilized over a large section for the stamping.

The discharge of the bon-bons on to the cooling conveyor band takes place at the lower part of the stamping ring. This ring moves in the same direction and with the same speed as the conveyor band. The discharge of the stamped shaped pieces can consequently take place in the most careful manner and without auxiliary appliances such as sliding plates or brushes. Deformation of the stamped pieces is thereby avoided with certainty.

One construction of the improved machine is shown in the accompanying drawings as an example.

Fig. 1 is a front elevation and
Fig. 2 is a plan view, while
Fig. 3 is a side elevation.
Figs. 4 and 5 show a part of the apparatus in cross-section on the line 4—4 of Fig. 5 and longitudinal section on the line 5—5 of Fig. 4, respectively, on a larger scale.

On the machine frame 1 are journalled the stamping tools, consisting of a wheel-like rotating body 2 and an annular rotating body 3, the part 2 being mounted on a shaft 4 and the part 3 between supporting rollers 5, 6, 7. The rotating bodies, 2, 3 are eccentrically disposed with respect to each other so that they are in contact at one point at their outer and inner peripheries, respectively. From here, the point of contact gradually merges into a crescent-shaped space gradually increasing in size on both sides. The mould halves or moulding recesses of the stamping tools are consequently in contact with each other over a comparatively long stretch. The drive is effected, for example, by an electric motor or from a belt pulley 8 which drives through the gears 9, 10, 11, 12, a shaft 13 for the returning roller 14 of a conveyor band 15.

Additional gears 16, 17 drive a gear 18 fitted on the shaft 4, from which there is driven, through gears 19, 20 and 21, a shaft 22, and from this through bevel gears 23, 24 the vertical shaft 25 of one of the equalizing rollers 26, 27. The rope or strip of the mass 28 is fed to the latter over the inlet screen 29 and through a funnel-like member 30. The roller 27 is mounted on an eccentric 31 and can be adjusted by moving a lever 32 on a guide 33 to correspond to different thicknesses of the strip or roll of the mass. The lever 32 is fixed in the adjusted position by a screw 34. At the roller 26 there is provided a deflecting plate 35, by means of which the mass roll or strip is turned through 180° and fed to a curved trough 36 which guides it into the crescent-shaped space on the stamping wheel 2, that is, above the moulds 37 thereof. On the rotation of the wheel 2, the mass or strip is also pressed into the mould-halves or recesses 38, corresponding at the moment with the mould-halves or recesses 37, of the loosely-running ring 3, as clearly shown in Fig. 5. On the wheel 2 there are mounted on both sides of each of the mould halves 37, so as to suitably project into the same and be capable of axial displacement, members or bodies 39, 40, which are forced outwardly by means of springs 41 but are forced inward at the moulding point by guide surfaces 42, 43. After passing the guide surfaces, the press bodies 39, 40 return into the initial position, the moulds 37, 38 move away from each other, and the finished stamped pieces 44, at the lower part of the ring 3 where the conveyor band 15 abuts tangentially to the ring, are forced by a guide plate 45 gradually and smoothly out of the moulds 38 on to the band 15 which conveys them, for example, to a packing place or the like. A brush 46 cleans the moulds 37, 38 and throws out any pressed pieces remaining suspended in the wheel 2 over the guide plate 45.

The rotating bodies 2, 3 can be easily exchanged if bon-bons of a different shape and ornamentation are to be made. In the same way, the guide surfaces 42, 43 are mounted on the frame 1 or on a lever 47 folding down outwardly so as to be readily interchangeable. The lever 47 is fixed in the working position by a disengageable latch 18. An intermediate lever 49 serves for the fine adjustment of the guide surface 43 and is forced by a screw 50 against a bolt 52 influenced by a spring 51. The latter permits an elastic yielding of the press bodies 40 on an excessive pressure arising. To remove the ring 3, the supporting roller 5, which is mounted on a crank arm 53 on a worm wheel 54, is first swung out from the ring 3 by rotating the worm wheel 54 by means of a worm 55 and hand wheel 56, and then swung sideways by rotation about the vertical shaft of the worm so that the ring 3 can then be removed from the supporting rollers 6, 7.

I claim:—

1. A machine for stamping soft kneadable masses into bon-bons and the like comprising a rotatable wheel, mould-halves carried on the periphery of said wheel, an annular member, means supporting said annular member for free rotation, mould-halves carried on the internal periphery of the annular member and adapted to co-operate with the mould-halves carried on the wheel, said wheel being eccentrically disposed relatively to the annular member so that the co-operating mould-halves contact at a definite point and are separated by a space at other points, means for rotating the wheel and means for feeding a soft mass in a path extending in opposed directions to the space between the separated mould-halves.

2. In a machine of the class described, the combination of a rotatable inner moulding member provided upon its periphery with a plurality of moulding recesses, an annular co-operating moulding member surrounding said inner moulding member in eccentric relation thereto and provided upon its inner periphery with co-operating moulding recesses, said moulding members being in internal rolling relation to each other and defining an internal receiving chamber, and means having a path doubling upon itself for delivering the material to be moulded to said receiving chamber.

3. In a machine of the class described, the combination of a rotatable inner moulding member provided upon its periphery with a plurality of moulding recesses, an annular co-operating moulding member surrounding said inner moulding member in eccentric relation thereto and provided upon its inner periphery with co-operating moulding recesses, said moulding members being in internal rolling relation to each other and defining an internal receiving chamber, a pair of delivery members extending in opposite directions, one of said members communicating with said internal receiving chamber for delivering material to be moulded thereto, and deflecting means co-operating with said delivery members for deflecting said material from one delivery member to the other.

4. A machine for forming bon-bons and the like from soft kneadable masses, comprising an inner series of mould-halves, a co-operating outer series of mould-halves, a wheel supporting said inner series of mould-halves on its periphery, an annular member of larger internal diameter than said wheel supporting said outer series of mould-halves on its inner periphery, means rotatably supporting said wheel, means rotatably supporting said annular member, said supporting means being so disposed relatively to each other that the inner and outer series of mould-halves are disposed eccentrically to each other and in contact at one point while being separated by a crescent-shaped space elsewhere, means for rotating the wheel, a screen member along which a soft, kneadable mass is traversed, a hopper member to which the mass is delivered by the screen member, a pair of equalizing rollers between which the mass is delivered by the hopper member, a guide plate for deflecting the mass issuing from said rollers through 180°, a curved trough for delivering the deflected mass into the crescent-shaped spaced in advance of the point where the series of mould-halves contact with each other, means adjustable to develop movements of varying extent for applying lateral pressure to the contents of the mould-halves as the latter pass the point of contact, and means for displacing the moulded products from the mould-halves after they have passed said point of contact.

5. A machine for forming bon-bons and the like from soft kneadable masses, comprising an inner series of mould-halves, a co-operating outer series of mould-halves, a wheel supporting said inner series of mould-halves on its periphery, an annular member of larger internal diameter than said wheel supporting said outer series of mould-halves on its inner periphery, means rotatably supporting said wheel, means rotatably supporting said annular member, said supporting means being so disposed relatively to each other that the inner and outer series of mould-halves are disposed eccentrically to each other and in contact at one point while being separated by a crescent-shaped space elsewhere, means for rotating the wheel, means for feeding a soft kneadable mass into the said crescent-shaped space in advance of the point where the mould-halves contact with each other, means adjustable to develop movements of varying extent for applying lateral pressure to the contents of the mould-halves as the latter pass said point of contact, a guide plate for forcing the products laterally from the mould-halves after they have passed said point of contact, and a conveyor band located in abutting tangential relation to said annular member adapted to receive said products, said band travelling in substantially the same direction and at the same speed as the discharging mould-halves.

HERMANN THÜRLINGS.